United States Patent
Athenstaedt et al.

(10) Patent No.: US 6,563,625 B1
(45) Date of Patent: May 13, 2003

(54) ELECTROCHROMIC GLASS COMPONENT

(75) Inventors: Wolfgang Athenstaedt, Graz (AT); David Macher, Osterrreich (AT); Heinz Zorn, Osterreich (AT); Thomas Soczka-Guth, Hoffheim (DE)

(73) Assignee: Magna Auteca Zweigniederlassung der Magna Holding, Weiz (AT)

( * ) Notice: Subject to any disclaimer, the term of this patent is extended or adjusted under 35 U.S.C. 154(b) by 0 days.

(21) Appl. No.: 09/831,535

(22) PCT Filed: Nov. 9, 1999

(86) PCT No.: PCT/EP99/08572

§ 371 (c)(1),
(2), (4) Date: Jul. 16, 2001

(87) PCT Pub. No.: WO00/28374

PCT Pub. Date: May 18, 2000

(30) Foreign Application Priority Data

Nov. 10, 1998 (DE) .......................................... 198 51 717

(51) Int. Cl.$^7$ ............................................... G02F 1/153
(52) U.S. Cl. ........................ 359/265; 359/267; 359/270; 359/274; 359/275
(58) Field of Search ................................ 359/265–275; 252/586

(56) References Cited

U.S. PATENT DOCUMENTS

| | | | | |
|---|---|---|---|---|
| 4,231,641 A | * | 11/1980 | Randin .......................... | 359/274 |
| 4,573,768 A | * | 3/1986 | Polak et al. ................... | 359/270 |
| 4,715,691 A | * | 12/1987 | Sata et al. .................... | 359/267 |
| 4,750,817 A | * | 6/1988 | Sammells ..................... | 359/270 |
| 4,772,940 A | * | 9/1988 | Wudl et al. ................... | 348/803 |
| 4,887,890 A | | 12/1989 | Scherber et al. ............. | 359/265 |
| 4,898,923 A | * | 2/1990 | Katritzky et al. .............. | 528/73 |
| 4,923,289 A | | 5/1990 | Demiryont .................... | 359/265 |
| 4,973,391 A | * | 11/1990 | Madou et al. ................ | 205/419 |
| 5,096,561 A | * | 3/1992 | Akhtar ......................... | 204/296 |
| 5,241,411 A | | 8/1993 | Arribart et al. .............. | 359/269 |
| 5,274,493 A | | 12/1993 | Couput et al. ............... | 359/275 |
| 5,306,443 A | * | 4/1994 | Kaneko et al. ........ | 252/519.33 |
| 5,352,504 A | | 10/1994 | Boulanger et al. .......... | 428/216 |
| 5,418,091 A | * | 5/1995 | Gozdz et al. ................ | 429/252 |
| 5,507,965 A | | 4/1996 | Padoy et al. ................ | 252/62.2 |
| 5,521,019 A | * | 5/1996 | Alloin et al. .................. | 429/33 |
| 5,604,626 A | | 2/1997 | Teowee et al. ............. | 359/265 |
| 5,724,177 A | | 3/1998 | Ellis, Jr. et al. ............. | 359/273 |
| 5,789,106 A | * | 8/1998 | Rosenmeier et al. .......... | 429/33 |
| 5,838,483 A | | 11/1998 | Teowee et al. ............. | 359/265 |
| 6,059,943 A | * | 5/2000 | Murphy et al. .............. | 204/296 |
| 6,067,184 A | * | 5/2000 | Bonhote et al. ............. | 359/265 |
| 6,194,072 B1 | * | 2/2001 | Hambitzer et al. ....... | 428/411.1 |
| 6,264,857 B1 | * | 7/2001 | Kreuer et al. ............... | 204/296 |
| 6,426,397 B1 | * | 7/2002 | Armand et al. ............ | 526/240 |
| 2002/0012848 A1 | * | 1/2002 | Callahan et al. ............ | 429/306 |
| 2002/0045713 A1 | * | 4/2002 | Feiring et al. ............ | 525/326.2 |

* cited by examiner

Primary Examiner—Evelyn Lester
(74) Attorney, Agent, or Firm—Clark Hill PLC

(57) ABSTRACT

The invention relates to an eclectrochromic glass component, particularly for motor vehicle mirrors, which contains a doped ion-conducting basic polymer (4) as the ion-conducting layer. The electrochromic glass component consists, for example of a glass substrate (1) as well as a layer system having an electrochromic layer (2), a mirror layer (3), a doped polymer membrane (4), for example of polybenzimidazole polymer, a proton store (5), a rear electrode (6) and a polyester film (7). The layer system is sealed by a seal (8) which closes the coating system towards the glass substrate (1).

19 Claims, 2 Drawing Sheets

ELECTROCHROMIC GLASS COMPONENT

FIELD OF INVENTION

The invention relates to an elecerochromic glass component, particularly for motor vehicle mirrors, which contains a doped ion-conducting basic polymer as the ion-conducting layer.

BACKGROUND OF INVENTION

Electrochromic mirrors, particularly for motor vehicles, are known in the state of the art. The essential element of these electrochromic mirrors is a layer of electrochromic material. A material is termed electrochromic when it changes its optical constants (n, k) and hence its optical properties on application of an electric field. Typical examples of such electrochromic materials are $WO_3$ and $MoO_3$, which are virtually colourless when applied to a substrate in thin layers. An electrochromic layer may change its optical properties by oxidation or reduction processes. If protons move in such a layer, in the case of tungsten oxide there is a reduction to blue tungsten bronze. The intensity of colouration is determined by the quantity of charge which has flowed in the layer.

Numerous electrochromic mirrors, particularly for motor vehicles, are now know from the state of the art and have electrochromic layers of this type in different layered structures. German 3 008 768 describes an electrochromic mirror which essentially consists of a layer system built on a glass substrate at least one electrochromic layer, at least two electrodes, at least one proton-conducting layer and at least one proton-delivering and one proton-storing layerbeing present.

The optical change properties of a mirror of this type are determined, inter alia, by the proton conductivity of the proton-conducting layer. The higher the proton conductivity, the higher also the rate of change of reflection. In the mirrors of the state of the art, proton-conducting glass plates, which were soaked with sulphuric acid, have been used hitherto as proton-conducting layers (for example in German Offenlegungaschrift 2 504 905) or as in German 3 008 768 so-called solid ion-conducting layers.

It has been shown all these ion-conducting layers from the state of the art used hitherto for the electrochromic glass components still do not have satisfactory results with regard to ion conductivity. Furthermore, it is disadvantageous for the mirrors of the state of the art, that the ion-conducting layers described there are either too thick or are too complex and expensive as regards their mode of manufacture.

SUMMARY OF INVENTION

The object of the present invention is therefore, starting from the electrochromic mirror as described in german 3 008 766, to indicate a significantly improved embodiment which is characterised particularly by an ion-conducting layer which is favourable to apply as regard to manufacture and processing and furthermore has a high ion conductivity, with which it is possible to change the electrochromic layer quickly.

The invention is achieved by the characterizing features of patent claim 1. The sub-claims show advantageous further developments.

According to the invention it is thus proposed to use a doped ion-conducting basic polymer as the ion-conducting layer. It has been shown that these doped ion-conduction basic polymers are particularly well suited. The doped ion-conducting basic polymer is preferably selected from polybenzimidazoles (PBI), polypyridines, polyimidazoles, polybenzthiazolea, polybenzoxazoles, polyquinolines, polythiazoles, polyoxadiazoles and polytetrapyrenes. The ion-conducting layer is thus a layer which preferably conducts protons. However, in principle the layer is also suitable for other ions, such as for example lithium.

DESCRIPTION OF THE DRAWINGS

The invention is illustrated in more detail below using FIG. 1 and FIG. 2.

DESCRIPTION OF THE INVENTION

Figure 1:
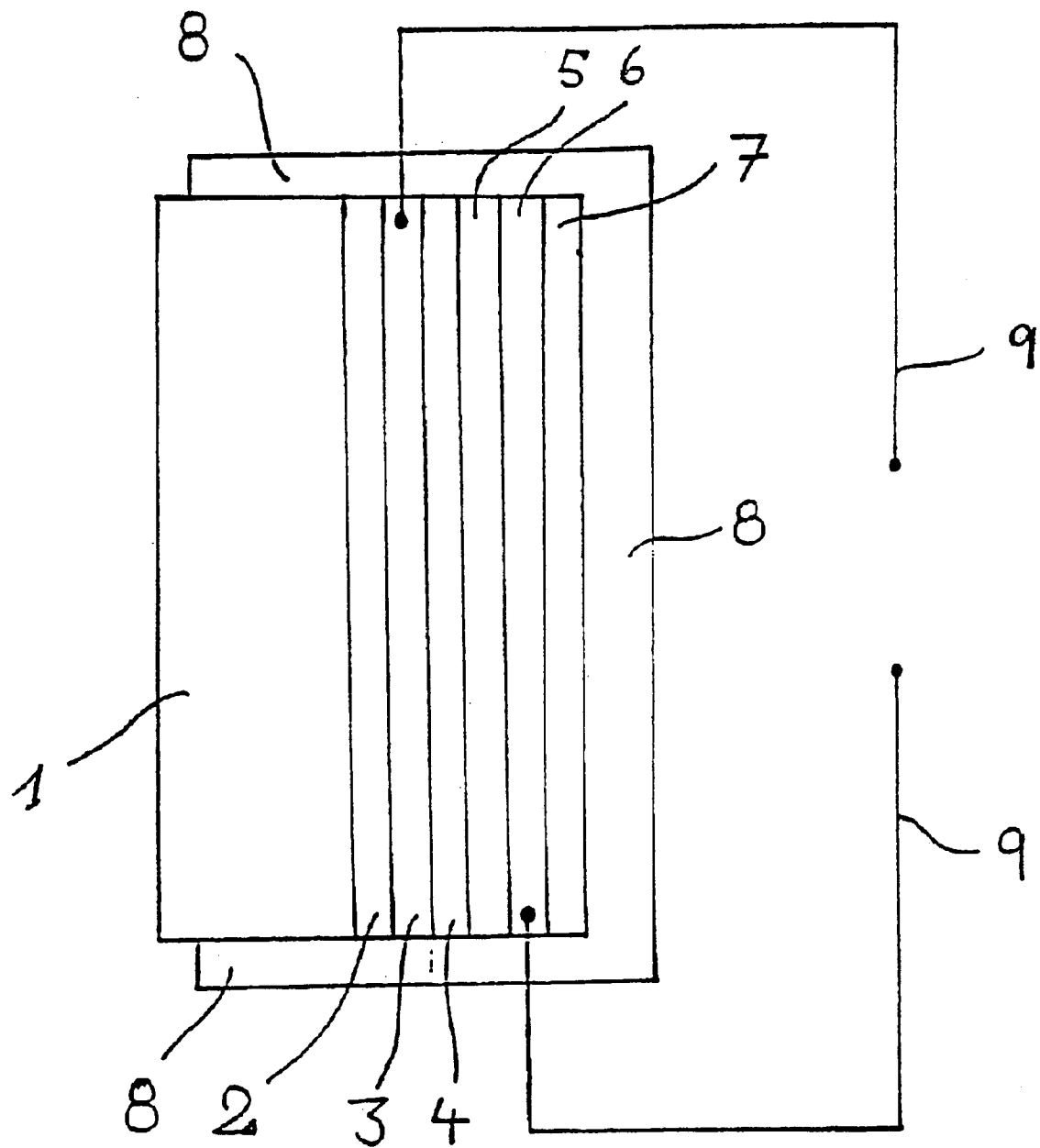
FIG. 1 snows an electrochromic glass component of the invention, here as a motor vehicle mirror.

The electrochromic glass component, which is used as a motor vehicle mirror, consists of a glass substrate 1 having a thickness of 2 mm. A layer system which has the following successive layers is applied to this substrate 1.

An electrochromic layer 2 of tungsten oxide having a thickness of ~700 nm, a mirror layer 3 of palladium having a thickness of ~70 nm, a polymer membrane 4 of polybenzimidazols polymer having a thickness of 30 μm, a proton store 5 of tungsten trioxide having a thickness of 700 nm, a rear electrode 6 of gold having a thickness of 100 nm, a polyester film 7 having a thickness of about 175 μm as well as a sealing layer 8 of traditional plastics, which wraps around the entire coating system including the glass substrate 1 and thus seals the coating system comprising layers 2 to 7. Seal 8 is only interrupted by copper wires 5, which contact the mirror layer 3 on the one side and the rear electrode 6 on the other side to apply a voltage to the latter.

Figure 2A:
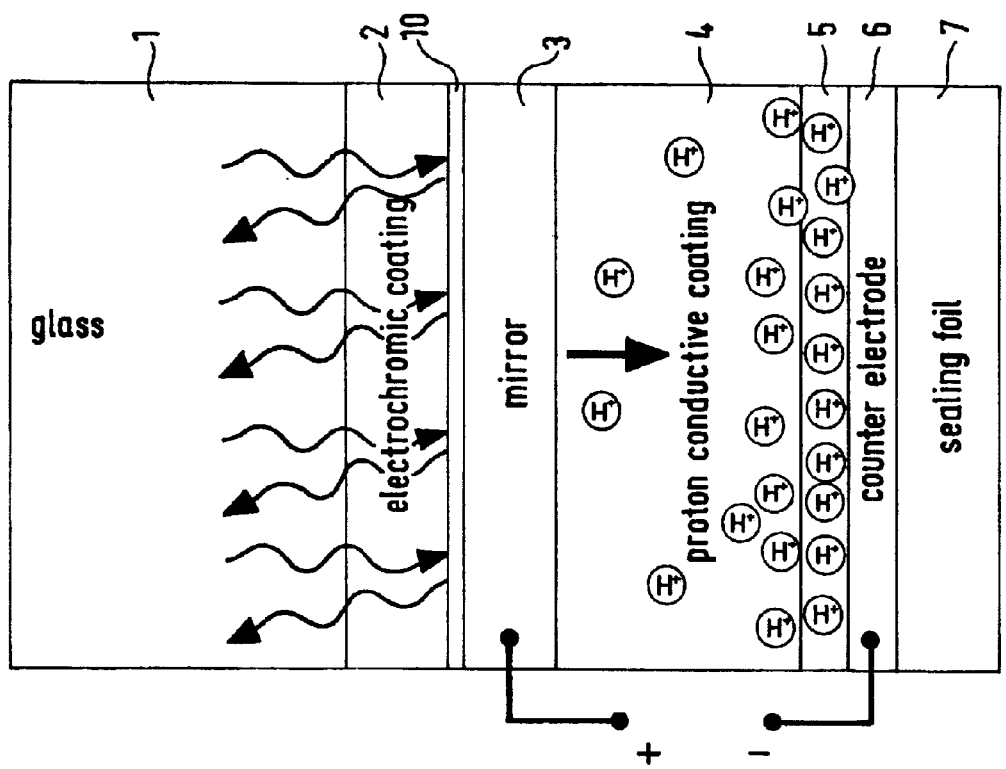
FIG. 2 shows the concrete structure of a mirror.
Figure 2B:
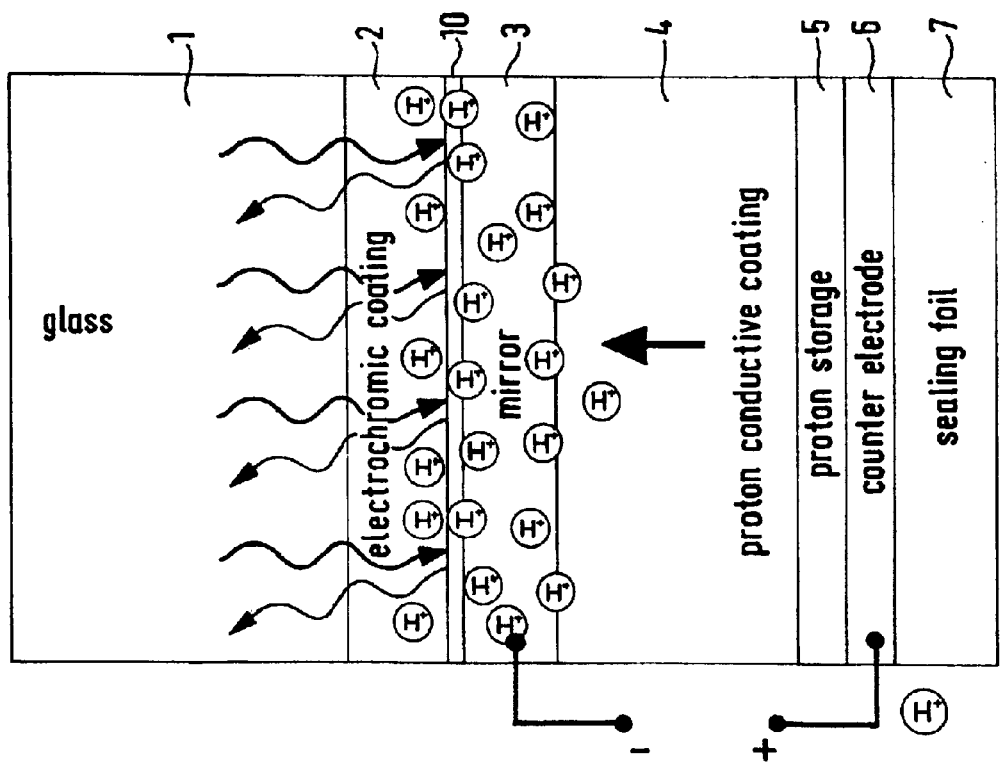

FIGS. 2a and 2b show the electrochromic glass component according to FIG. 1, but the function of a glass component of this type becomes visible here. In the exemplary embodiment according to FIG. 2, a primer 10 for better adhesion promotion is also applied between the electrochromic layer 2 and the mirror layer 3. FIG. 2a thus shows the light position and FIG. 2b the dark position.

It is particularly preferable for the electrochromic glass component of the invention if the doped ion-conducting polymer is present in the form of a polymer membrane, A proton-conduction polymer membrane particulate preferred. It should be emphasized in particular for the ion-conducting layer according to the invention that it may be applied easily using all conventional techniques. Examples of these are screen printing, immersion, spraying, blade coating or also application of a gel.

According to the present invention it is particularly preferable if the polymer membrane is a polybenzimidazole.

It should be emphasized in particular for the electrocromic glass component of the invention that the doped ion-conducting layer has particularly good properties with regard to its ion conductivity if the ion-conducting layer is doped with an acid, in particlarly with a strong acid. It is preferable if the pKa value of the doping acid $\leq 4.5$, preferably $\leq 3.5$ for the first dissociation stage at 25° C. For acid it has proved to be particularly advantageous if the acid is a phosphoric acid, in particular a polyphosphoric acid. Acid treatment of polybenzimidazoles is described in U.S. Pat. No. 5,599,639, to which reference is made expressly here.

It is particularly preferable for the electrochromic glass conponent of the invention if it contains a proton-conducting polymer membrane of polybenzimidazole.

Polymer membranes of this type, which are composed of polybenzimidazoles and are proton-conducting, are known from the state of the art, for example from U.S. Pat. No. 5,017,681. All named polybenzimidazoles in the above-mentioned United States patent specification may be used in principle for the proton-conducting layer of the invention. It is particularly preferable if the polymer consists of a polybenzimidazole having a molecular weight between 1,000 and 500,000 which consists of repeating units of the following structural formula:

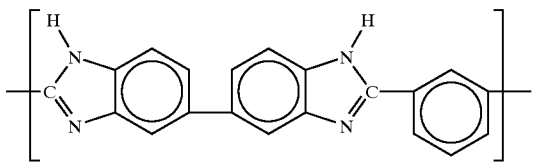

It has proved to be particularly favourable for the electrohromic glass component if the ion-conducting layer described in more detail above is used at a layer thickness of 1 μm to 1 mm, preferably 5 μm to 100 μm. Application of the layer, in particular the polymer membrane, may thus be affected by screen printing, immersion, spraying, blade coating or even as a gel. Provision is thus made according to the invention in that the layer is applied either as a finished film or is even produced directly on the substrate or a layer lying underneath. These application procedures may also be used in combination.

The electrochromic layer, which preferably has a layer thickness of 300 nm to 8,000 nm, preferably 300 nm to 8,000 nm, preferably consists of $WO_3$, $MoO_3$, $IrO_2$ or mixed oxides thereof. The electrochromic layer is applied by sputtering, sol-gel or by vapour deposition.

The electrodes, which are necessary for constructing the layer system of the invention, are preferably metallic layers having a layer thickness of 50 nm to 10 μm. Examples of layers of this type are those which contain rhodium, palladium, platinum or alloys thereof.

According to a preferred embodiment, provision is made in that a metallic electrode layer at the same time forms a reflector which may accept protons This reflector preferably consists of a layer having a layer thickness of 30 nm to 500 nm, which contains rhodium, palladium, platinum or alloys thereof.

As already described in German 3 008 768, it is also preferable for the electrochromic glass component of the invention if the ion-delivering layer and the ion-storing layer at the same time form a layer or a composite. According to a preferred embodiment of the invention, provision is thus made in that the proton-storing layer is the electrochromic layer at the same time. In this case, for example a $WO_3$ layer, thus functions at the same time as a hydrogen ion-storing layer and as an electrochromic layer. According to a preferred embodiment, the composite consists of the proton-storing and at the same time proton-delivering layer on a film, preferably a polyester film with metallisation which is the counter-electrode. Instead of the film of polyester, glass, metal or other plastics are suitable as substrate materials for the composite.

With regard to the possible layered structure variants of the electrochromic glass component of the invention, reference is made to German 3 008 768 and the layered structure described therein.

However, it is preferable for the glass component of the invention if the glass component has been constructed from two layered composites. Hence, in the manufacture of the electrochromic glass component according to a preferred embodiment, a first layer system is constructed on a glass substrate, an electrochromic layer applied thereto and metallisation as a reflector. These layers are produced by means of sputtering processes.

The second part of the layer system is then a composite which consists of a proton-storing layer, metallisation and a film arranged thereabove, in particular a polyester film. This composite is manufactured in a separate process step and then joined to the above-mentionad first layered composite of the layer system. This procedure facilitates cost-effective and simple manufacture of the electrochromic glass component.

A further favourable embodiment of the invention makes provision, if it is necessary, in that adhesion-promoting layers for better bonding are applied between the individual layers. Examples of this are chromium, titanium or even silicon oxides $SiO_x$. For application as motor vehicle mirrors, provision is also made in that the layer system is tightly sealed externally. Hence the layer system may be sealed at the and-faces and a final layer, that is a layer opposite the glass substrate seen in the viewing direction, may be provided with a protective layer, for example a diffusion barrier. Diffusion barriers of this type have a water permeability >1,000, preferably >100 $cm^3$. For motor vehicle mirrors it has proved to be particularly favourable if the glass substrate is a reflection-reducing thin glass having a layer thickness of 0,1 to 3 mm. For motor vehicle mirrors it is also advisable if a transparent conductive layer for heating the mirror is applied in front of the substrate, seen in the viewing direction.

What is claimed is:

1. Electrochromic glass component having a stacked layer system arranged on a glass substrate containing at least one electrochromic layer, at least two electrodes, at least one ion-conducting layer, at least one ion-delivering layer and at least one ion-storing layer characterised in that the ion-conducting layer contains a doped ion-conducting polymer membrane, wherein the doped ion-conducting polymer membrane is selected from polybenzimidazoles, (PEI), polypyridines, polyimidazoles, polyenzthiazoles, polybenzoxazoles, polyquinolines, polythiazoles, polyoxadiazoles and polytetrapyranes.

2. Electrochromic glass component according to claim 1, characterised in that the polymer membrane consists of a polybenzimidazole polymer.

3. Electrochromic glass component according to claim 2, characterised in that the ion-conducting layer is doped with acid.

4. Electrochromic glass component according to claim 3, characterised in that the layer has been doped with phosphoric acid.

5. Electrochromic glass component according to claim 4, characterised in that the pKa value of the free acid is $\leq 4.5$ at 25° C. for the first dissociation stage.

6. Electrochromic glass component according to claim 5, characterised in that the ion-conducting layer has a thickness of 1 μm to 1 mm.

7. Electrochromic glass component according to claim 6 characterised in that the ion-conducting layer is applied to the substrate or a different layer of the layer system or is produced thereon.

8. Electrochromic glass component according to claim gcharacterised in that the electrochromic layer is an oxidation-reduction layer consisting of metal oxides.

9. Electrochromic glass component according to claim 8, characterised in that the electrochromic layer is a $WO_3$ layer having a layer thickness of 100 nm to 3,000 nm.

10. Electrochromic glass component according to claim 9, characterised in that at least one electrode is designed in the form of metallic layers having a layer of thickness of 100 nm to 10 μm.

11. Electrochromic glass component according to claim 10, characterised in that a metallic electrode layer forms a reflector which may accept and conduct protons at the same time.

12. Electrochromic glass component according to claim 11, characterised in that the ion-delivering and ion-storing layer is in the form of a composite.

13. Electrochromic glass component according to claim 12, characterised in that the composite consists of a substrate, for example of glass, metal or plastic, for example a polyester film, to which a proton-storing layer, for example a metal oxide layer, is applied.

14. Electrochromic glass component according to claim 13, characterised in that the composite additionally has an electrode layer in the form of metallisation.

15. Electrochromic glass component according to claim 14, characterised in that an electrochromic layer, metallisation as a reflector, a proton-conducting membrane and a composite of a proton-storing layer, metallisation and a film arranged thereon, in particular of polyester, is applied to a glass substrate one after another.

16. Electrochromic glass component according to claim 15, characterised in that the layer system is sealed at the end-faces.

17. Electrochromic glass component according to claim 16, characterised in that the final layer opposite the glass substrate is provided with a protective layer.

18. Electrochromic glass component according to claim 17, characterised in that a reflection-reducing thin glass having a layer thickness of 0.3 to 3 mm is used as the glass substrate.

19. Electrochromic glass component according to claim 18, characterised in that a conductive layer for heating the mirror is applied in front of the substrate.

* * * * *

UNITED STATES PATENT AND TRADEMARK OFFICE
CERTIFICATE OF CORRECTION

PATENT NO. : 6,563,625 B1　　　　　　　　　　　　　　　　　　　　　Page 1 of 1
DATED : May 13, 2003
INVENTOR(S) : Wolfgang Athenstaedt et al.

It is certified that error appears in the above-identified patent and that said Letters Patent is hereby corrected as shown below:

<u>Column 1,</u>
Line 27, "Know" should be -- Known --.
Line 56, "766" should be -- 768 --.
Line 62, "characterizing" should be -- characterising --.
Line 67, "ion-conduction" should be -- ion-conducting --.

<u>Column 2,</u>
Line 13, "snows" should be -- shows --.
Line 58, "particularly" should be -- particular --.

<u>Column 3,</u>
Line 25, "affected" should be -- effected --.
Lines 39-40, "palladium" should be -- palladium, --.
Line 43, add a period after "protons".

<u>Column 4,</u>
Line 25, ">1,000" should be -- <1,000 --.
Line 25, ">100" should be -- <100 --.
Lines 62-63, "gcharacterised" should be -- 7 characterised --.

Signed and Sealed this

Second Day of September, 2003

JAMES E. ROGAN
*Director of the United States Patent and Trademark Office*